United States Patent
Iwata

(10) Patent No.: US 10,605,115 B2
(45) Date of Patent: Mar. 31, 2020

(54) WASTE GATE VALVE FOR TURBOCHARGER

(71) Applicant: TOYOTA JIDOSHA KABUSHIKI KAISHA, Toyota-shi (JP)

(72) Inventor: Akitoshi Iwata, Seto (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 133 days.

(21) Appl. No.: 15/894,244

(22) Filed: Feb. 12, 2018

(65) Prior Publication Data

US 2018/0230848 A1 Aug. 16, 2018

(30) Foreign Application Priority Data

Feb. 16, 2017 (JP) .................. 2017-027082

(51) Int. Cl.
*F01D 17/10* (2006.01)
*F16K 1/20* (2006.01)
*F02B 37/18* (2006.01)

(52) U.S. Cl.
CPC .......... *F01D 17/105* (2013.01); *F02B 37/183* (2013.01); *F16K 1/2007* (2013.01); *F16K 1/2035* (2013.01); *F05D 2220/40* (2013.01); *F05D 2260/606* (2013.01); *Y02T 10/144* (2013.01)

(58) Field of Classification Search
None
See application file for complete search history.

(56) References Cited

U.S. PATENT DOCUMENTS

| 2012/0138827 | A1* | 6/2012 | Kim | F02B 37/186 |
| | | | | 251/129.11 |
| 2014/0345273 | A1 | 11/2014 | Yamaguchi et al. | |
| 2014/0366530 | A1 | 12/2014 | Murayama et al. | |
| 2016/0146098 | A1* | 5/2016 | Dilalan | F02B 37/186 |
| | | | | 251/228 |
| 2018/0094572 | A1* | 4/2018 | Huh | F02B 37/186 |
| 2018/0223727 | A1* | 8/2018 | Nakajima | F02B 37/186 |
| 2018/0230847 | A1* | 8/2018 | Nakamura | F01D 17/105 |
| 2018/0298811 | A1* | 10/2018 | Tanigaki | F16K 31/521 |

FOREIGN PATENT DOCUMENTS

| JP | 2012-527575 | A | 11/2012 |
| JP | 2013-185552 | A | 9/2013 |
| JP | 5995989 | B2 | 9/2016 |
| WO | WO 2010/135104 | A2 | 11/2010 |

* cited by examiner

*Primary Examiner* — Michael Lebentritt
(74) *Attorney, Agent, or Firm* — Oblon, McClelland, Maier & Neustadt, L.L.P.

(57) ABSTRACT

A waste gate valve for a turbocharger includes a valve body including a valve plate and a valve shaft, a swing arm including a shaft and a lever, a supporting plate fixed to a portion of the valve shaft that protrudes from the lever, and an elastic member clamped between the supporting plate and the lever or between the lever and the valve plate. One of the supporting plate and the lever that clamp the elastic member or one of the lever and the valve plate that clamp the elastic member includes a protruding portion that is positioned closer to the valve shaft than the elastic member or farther from the valve shaft than the elastic member and that protrudes toward the other of the supporting plate and the lever or toward the other of the lever and the valve plate.

8 Claims, 9 Drawing Sheets

WASTE GATE VALVE FOR TURBOCHARGER

INCORPORATION BY REFERENCE

The disclosure of Japanese Patent Application No. 2017-027082 filed on Feb. 16, 2017 including the specification, drawings and abstract is incorporated herein by reference in its entirety.

BACKGROUND

1. Technical Field

The present disclosure relates to a waste gate valve for a turbocharger.

2. Description of Related Art

WO 2010/135104 discloses a turbocharger that is provided with a waste gate valve that opens and closes a waste gate port provided in a turbine housing when a lever supporting a valve body rotates as a shaft penetrating the turbine housing rotates.

The waste gate valve for the turbocharger is provided with the valve body that is configured of a valve plate that abuts onto the turbine housing and closes the waste gate port and a valve shaft that is provided on a rear surface of the valve plate that is opposite to an abutting surface that closes the waste gate port. The valve body is attached to the lever that is supported by the turbine housing via the shaft such that the lever rotates. The valve body is attached to the lever in a state where the valve shaft is inserted into an insertion hole provided in the lever. A supporting plate is fixed to a portion of the valve shaft that protrudes from the insertion hole and the lever is interposed between the supporting plate and the valve plate. Therefore, the valve body is fixed to the lever such that the valve body tilts with respect to the lever.

In the waste gate valve in which the lever is interposed between the supporting plate and the valve plate and the valve body tilts with respect to the lever as described above, when there is a gap between the supporting plate and the lever or when there is a gap between the valve plate and the lever, the valve body wobbles and the valve body vibrates. With regard to this, when an elastic member is interposed between the valve plate and the lever or is interposed between the lever and the supporting plate as in the waste gate valve disclosed in WO 2010/135104, a gap is filled since the lever is urged, and thus it is possible to suppress the wobbling.

SUMMARY

However, even in a case where the elastic member is interposed to suppress the wobbling, since a gap formed between the valve plate and the lever or a gap formed between the lever and the supporting plate is relatively small in the first place, realizing an elastic member able to generate an appropriate urging force by being inserted into the gap having a relatively small size is accompanied by a great restriction in selecting the material of the elastic member.

Meanwhile, in a case where a gap formed between the valve plate and the lever or a gap formed between the lever and the supporting plate is purposely enlarged in order to make the above-described restriction less strict and a large elastic member is disposed in order to suppress the wobbling, the wobbling of the valve body becomes intensive instead of being suppressed when the elastic member is weakened and the appropriate urging force becomes unable to be obtained.

An aspect of the present disclosure relates to a waste gate valve for a turbocharger, the turbocharger including a turbine housing, the turbine housing including a waste gate port. The waste gate valve includes a valve body, a swing arm, a supporting table, and an elastic member. The valve body includes a valve plate and a valve shaft, the valve plate being configured to abut onto the turbine housing and to close the waste gate port, the valve shaft being disposed on a rear surface of the valve plate that is opposite to an abutting surface of the valve plate that closes the waste gate port. The swing arm includes a shaft and a lever, the shaft being supported such that the shaft rotates with respect to the turbine housing, the lever being formed with an insertion hole into which the valve shaft is inserted. The supporting plate is fixed to a portion of the valve shaft that protrudes from the insertion hole, the supporting plate being fixed to the valve shaft such that the lever is interposed between the supporting plate and the valve plate. The elastic member is clamped between the supporting plate and the lever or between the lever and the valve plate, the elastic member being configured to urge the lever in a direction in which the valve shaft extends. In the waste gate valve, the valve body is fixed such that the valve body tilts with respect to the lever. Furthermore, in the waste gate valve, one of the supporting plate and the lever that clamp the elastic member or one of the lever and the valve plate that clamp the elastic member includes a protruding portion that is positioned closer to the valve shaft than the elastic member or farther from the valve shaft than the elastic member and that protrudes toward the other of the supporting plate and the lever or toward the other of the lever and the valve plate.

According to the aspect of the present disclosure, a gap between a pair of members with the elastic member being interposed therebetween is narrowed by the protruding portion. Therefore, even when a gap between the members in an area where the elastic member is installed is widened such that the degree of freedom in designing the elastic member for obtaining an appropriate urging force is likely to be secured, it is possible to restrict relative movable ranges of the members in a direction in which the valve shaft extends by means of the protruding portion. Therefore, even when the elastic member is weakened, the magnitude of the wobbling is suppressed by the protruding portion.

In the waste gate valve according to the aspect of the present disclosure, the protruding portion may be integrated with any of the supporting plate, the lever, and the valve plate as a portion of any of the supporting plate, the lever, and the valve plate.

According to the aspect of the present disclosure, it is not needed to prepare a new component constituting the protruding portion. Therefore, it is possible to suppress an increase in number of components. Examples of a method of integrating the protruding portion with the member include a method of forming the protruding portion on a surface of the member through casting and a method of forming the protruding portion on a surface of the member through cutting and processing.

In the waste gate valve according to the aspect of the present disclosure, the protruding portion may be disposed farther from the valve shaft than the elastic member. Since the waste gate valve is provided in the turbine housing in which exhaust gas having an extremely high temperature flows, the exhaust gas having the extremely high temperature flows into a space between the supporting plate and the valve plate. With regard to this, when the protruding portion is provided farther from the valve shaft than the elastic member, exhaust gas that flows into a space between the supporting plate and the valve plate from the outside and that proceeds toward the elastic member is blocked by the protruding portion, and thus it is possible to suppress collision between the elastic member and the exhaust gas. Therefore, it is possible to suppress the progress of creep deformation of the elastic member that occurs due to collision with exhaust gas having an extremely high temperature.

In the waste gate valve according to the aspect of the present disclosure, the entire supporting plate side surface of the elastic member may be covered with a member out of the supporting plate and the lever that faces the elastic member and the entire valve plate side surface of the elastic member may be covered with a member out of the lever and the valve plate that faces the elastic member.

According to the aspect of the present disclosure, the elastic member is covered by members with the elastic member being interposed therebetween, and thus collision between the elastic member and exhaust gas can be suppressed. Therefore, it is possible to suppress the progress of creep deformation of the elastic member that occurs due to collision with exhaust gas having an extremely high temperature.

In the waste gate valve according to the aspect of the present disclosure, the elastic member may be an annular disc spring into which the valve shaft is inserted and that is interposed between the supporting plate and the valve plate along with the lever.

According to the aspect of the present disclosure, it is possible to suppress the wobbling over the whole circumference of the valve shaft by using the disc spring. In the waste gate valve according to the aspect of the present disclosure, the protruding portion may be disposed on a position such that the disc spring abuts onto the protruding portion before the protruding portion abuts onto a member out of the supporting plate, the lever, and the valve plate that faces the protruding portion.

The diameter of the disc spring changes as the disc spring is compressed and squashed. Therefore, when the disc spring abuts onto the protruding portion disposed inward or outward of the disc spring while the disc spring is being squashed, the disc spring becomes unlikely to be deformed. According to the aspect of the present disclosure, since the disc spring abuts onto the protruding portion before the protruding portion abuts onto a member facing the protruding portion, the disc spring becomes unlikely to be deformed before the member facing the protruding portion and the protruding portion collide with each other, and thus the valve body is restrained from moving in a direction such that collision of the protruding portion occurs with the disc spring being further deformed. Accordingly, it is possible to suppress a shock or noise that is generated due to collision between the member facing the protruding portion and the protruding portion.

In the waste gate valve according to the aspect of the present disclosure, the protruding portion may have an annular shape centered on the valve shaft. According to the aspect of the present disclosure, it is possible to restrict the magnitude of the wobbling over the entire circumferential area in the vicinity of the valve shaft by means of the protruding portion. In a case where the protruding portion is provided farther from the valve shaft than the elastic member, when the protruding portion has an annular shape as described above, it is possible to restrain exhaust gas from flowing toward the elastic member clamped between the supporting plate and the valve plate from the outside of the waste gate valve over the whole circumference.

In the waste gate valve according to the aspect of the present disclosure, the elastic member may be clamped in each of a space between the lever and the supporting plate and a space between the lever and the valve plate, and one of the supporting plate and the lever that clamp the elastic member or one of the lever and the valve plate that clamp the elastic member may include a protruding portion that is positioned closer to the valve shaft than the elastic member or farther from the valve shaft than the elastic member, and that protrudes toward the other of the supporting plate and the lever or toward the other of the lever and the valve plate.

According to the aspect of the present disclosure, even when the elastic member is weakened between the lever and the supporting plate or between the lever and the valve plate, it is possible to suppress the magnitude of the wobbling by means of the protruding portion.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
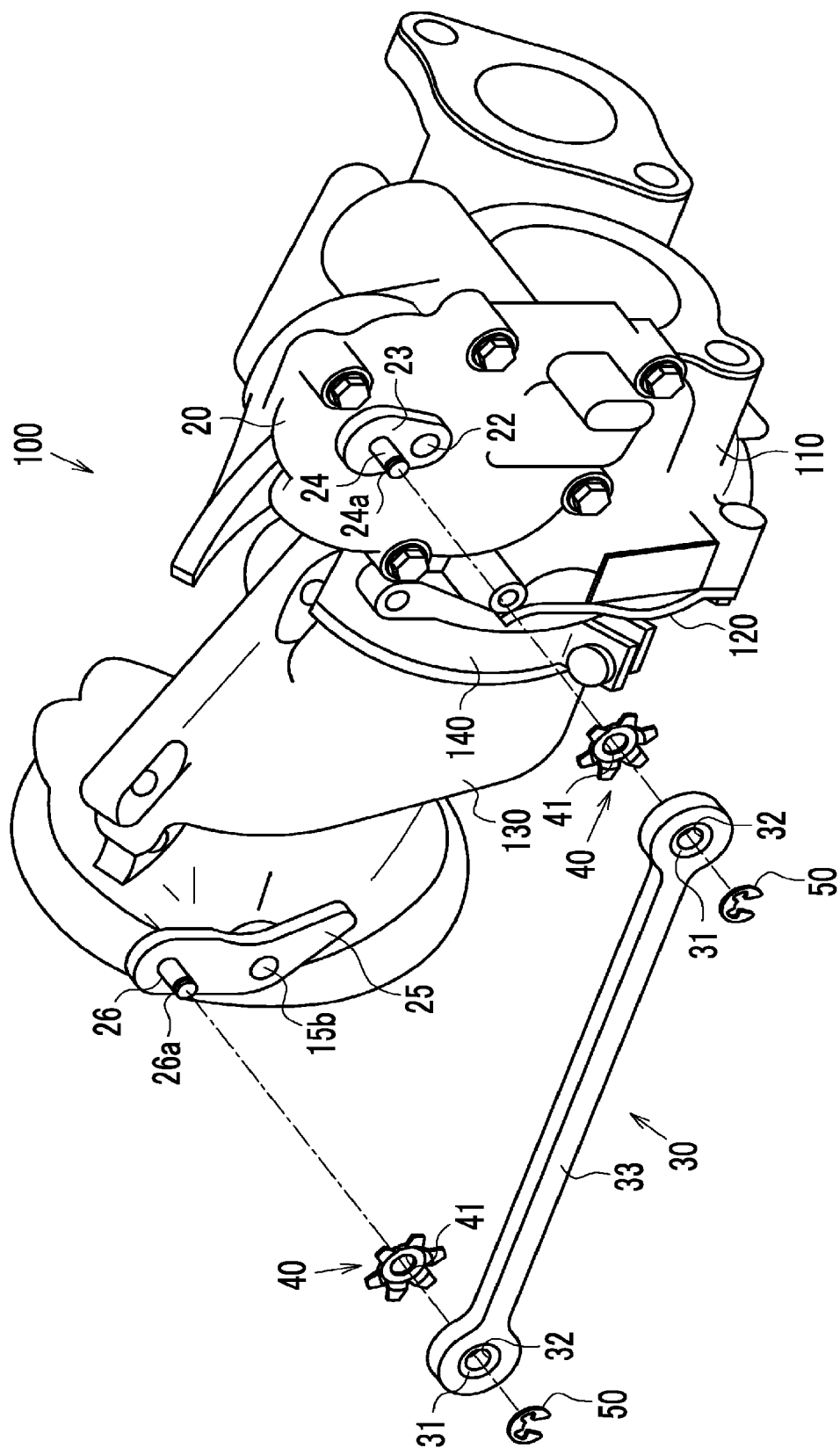
FIG. 1 is a perspective view of a turbocharger.

Hereinafter, an embodiment of a waste gate valve will be described with reference to FIGS. 1 to 7. As illustrated in FIG. 1, a turbocharger 100 is configured by combining a compressor housing HO, a bearing housing 120, and a turbine housing 130 with each other. The compressor housing 110 is a housing that accommodates a compressor wheel and the turbine housing 130 is a housing that accommodates a turbine wheel. In addition, the bearing housing 120 is a housing that supports a connection shaft that connects the compressor wheel and the turbine wheel.

The bearing housing 120 is fastened to the compressor housing 110 with a bolt. In addition, the turbine housing 130 is assembled with the bearing housing 120 via a clamp 140.

Figure 2:
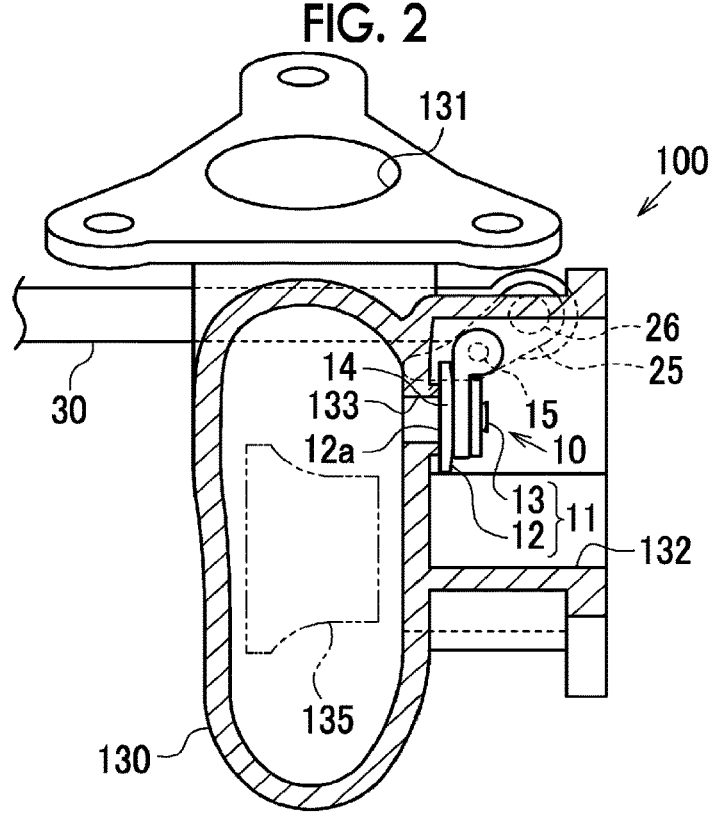
FIG. 2 is a partial sectional view of a turbine housing.

As illustrated in FIG. 2, a turbine wheel 135 is accommodated in the turbine housing 130 and a scroll path 131 that extends such that the scroll path 131 surrounds the turbine wheel 135 is formed in the turbine housing 130. Exhaust gas blown to the turbine wheel 135 through the scroll path 131 is discharged from the turbine housing 130 to an exhaust path through a discharging path 132.

In the turbocharger 100, the turbine wheel 135 rotates when exhaust gas passing through the scroll path 131 is blown to the turbine wheel 135. When the turbine wheel 135 rotates, the compressor wheel that is connected to the turbine wheel 135 via the connection shaft rotates and thus pressure-charging of intake air is performed.

As illustrated in FIG. 2, the turbine housing 130 is provided with a waste gate port 133. The waste gate port 133 is a path that connects the scroll path 131 and the discharging path 132 to each other while bypassing the turbine wheel 135.

The turbocharger 100 is provided with a waste gate valve 10. The waste gate valve 10 includes a disc-shaped valve plate 12 that closes the waste gate port 133 and the waste gate valve 10 opens and closes the waste gate port 133 by rotating around a shaft 15 that is supported by the turbine housing 130 such that the shaft 15 rotates.

As illustrated in FIG. 2, when the valve plate 12 abuts onto the turbine housing 130, the waste gate port 133 is closed by an abutting surface 12a of the valve plate 12. Meanwhile, when the waste gate port 133 is opened with the abutting surface 12a of the valve plate 12 being separated from the waste gate port 133, that is, when the waste gate valve 10 is opened, exhaust gas passing through the scroll path 131 flows into the discharging path 132 through the waste gate port 133. When the exhaust gas passing through the scroll path 131 flows into the discharging path 132 through the waste gate port 133 as described above, the amount of exhaust gas blown to the turbine wheel 135 becomes small. Therefore, in a case where the waste gate valve 10 is open, rotation of the turbine wheel 135 and the compressor wheel is suppressed, and thus the pressure-charging is suppressed.

Figure 3:
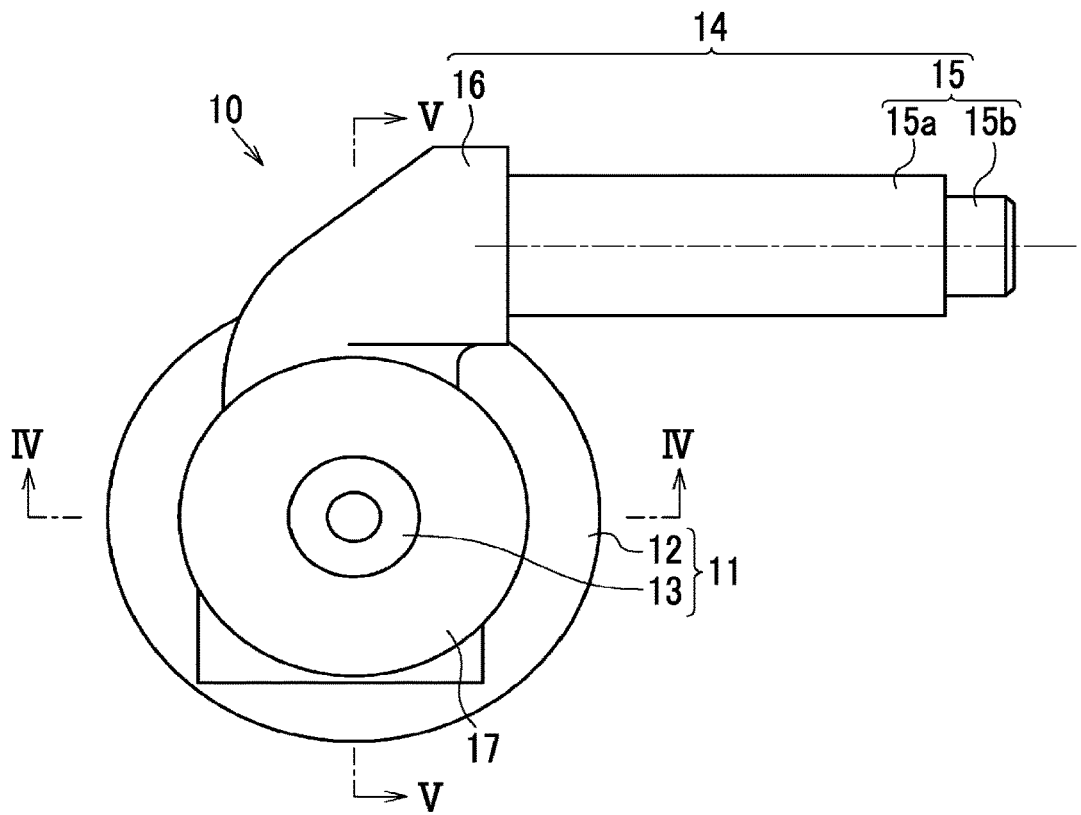
FIG. 3 is a top view of a waste gate valve.

The configuration of the waste gate valve 10 will be described in detail with reference to FIGS. 3 to 7. As illustrated in FIG. 3, the waste gate valve 10 is obtained by assembling a swing arm 14 provided with the shaft 15 and a valve body 11 with each other. The valve body 11 is assembled with a lever 16 of the swing arm 14.

The lever 16 connected to the shaft 15 is curved and a portion of the lever 16 has a plate-shape. The plate-shaped portion is opposite to a portion of the lever 16 that is connected to the shaft 15. The valve body 11 is supported by the plate-shaped portion and the portion supporting the valve body 11 is positioned to be offset from the central axis of the shaft 15 in a direction orthogonal to the central axis.

The shaft 15 is configured of a large-diameter portion 15a that is connected to the lever 16 and a small-diameter portion 15b of which the diameter is smaller than that of the large-diameter portion 15a. The large-diameter portion 15a and the small-diameter portion 15b are coaxially connected to each other.

Figure 4:
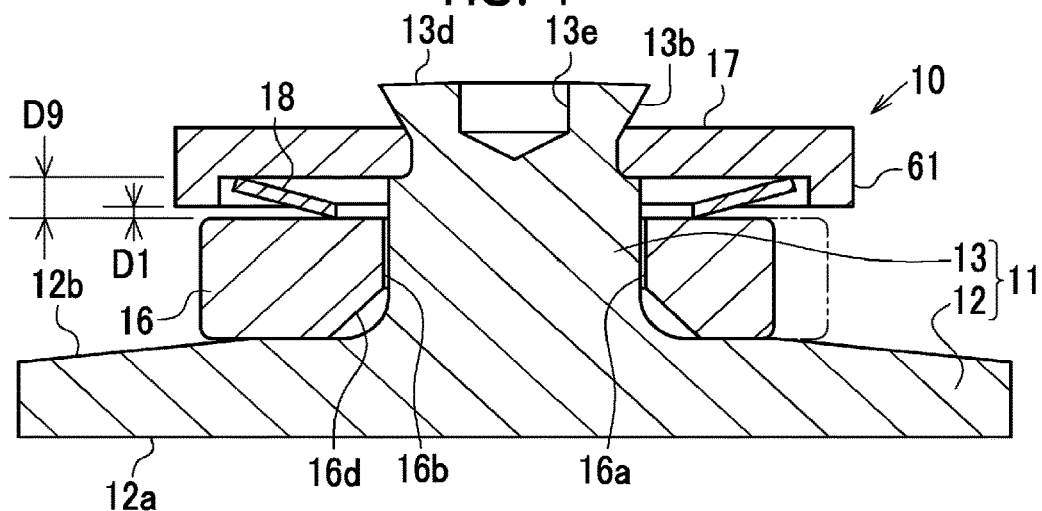
FIG. 4 is a sectional view taken along line IV-IV in FIG. 3.
Figure 5:
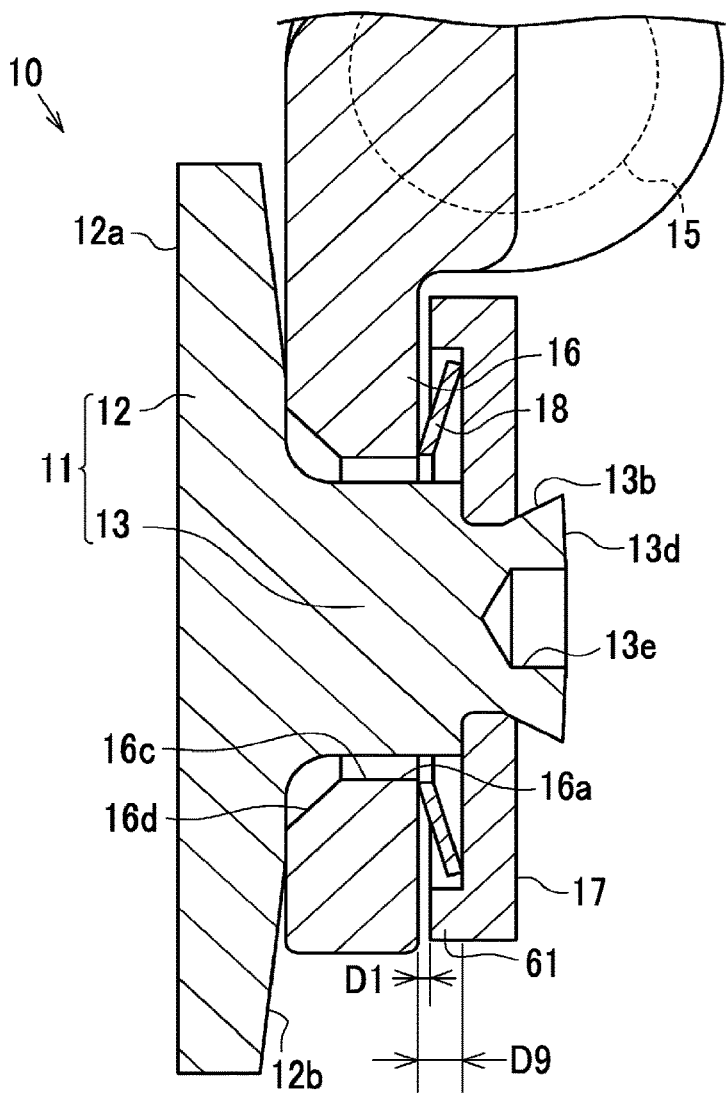
FIG. 5 is a sectional view taken along line V-V in FIG. 3.

As illustrated in FIGS. 4 and 5, the valve body 11 is fixed to the lever 16 in a state where a valve shaft 13 is inserted into an insertion hole 16a provided in the lever 16. The valve shaft 13 extends from a rear surface 12b of the valve plate 12 that is opposite to the abutting surface 12a such that the valve shaft 13 becomes perpendicular to the valve plate 12. The valve shaft 13 is provided on the center of the valve plate 12.

As illustrated in FIGS. 3 to 5, a plate-shaped supporting plate 17 is fixed to a portion of the valve shaft 13 that protrudes from the insertion hole 16a of the lever 16. The supporting plate 17 has a disc-shape and the diameter of the supporting plate 17 is larger than the diameter of the insertion hole 16a. Since the supporting plate 17 is fixed as described above, the valve body 11 is retained such that the valve shaft 13 does not come out of the insertion hole 16a.

As illustrated in FIGS. 4 and 5, an annular disc spring 18 that is provided with an insertion hole in the central portion thereof and that is continuous in a circumferential direction with no discontinuous portion is clamped between the lever 16 and the supporting plate 17. The valve shaft 13 is inserted into the insertion hole of the disc spring 18 and the disc spring 18 is clamped between the supporting plate 17 and the valve plate 12 in a state of being compressed along with the lever 16. Therefore, the lever 16 is pressed against the rear surface 12b of the valve plate 12 due to a restoring force of the disc spring 18.

As illustrated in FIGS. 4 and 5, an outer edge of the supporting plate 17 is provided with a protruding portion 61 that protrudes toward the lever 16 side. The protruding portion 61 is integrated with the supporting plate 17 and the protruding portion 61 has an annular shape that continuously extends along the outer edge of the supporting plate 17. That is, the protruding portion 61 has an annular shape centered on the valve shaft 13. In addition, since the diameter of the supporting plate 17 is larger than the diameter of the disc spring 18, the protruding portion 61 is provided farther from the valve shaft 13 than the disc spring 18. Therefore, an outer edge portion of the disc spring 18 is covered from the outside with the protruding portion 61 over the whole circumference.

As described above, in the waste gate valve 10, the protruding portion 61 that protrudes toward the lever 16 side is provided on a position on the supporting plate 17 that is farther from the valve shaft 13 than the disc spring 18. Since the protruding portion 61 is provided, a gap between the supporting plate 17 and the lever 16 is the narrowest in an area where the protruding portion 61 is provided. Specifically, a gap D1 between the protruding portion 61 of the supporting plate 17 and the lever 16 is smaller than a gap D9 between the supporting plate 17 and the lever 16 in an area other than the area where the protruding portion 61 is provided (for example, area where disc spring 18 is disposed).

Figure 6:
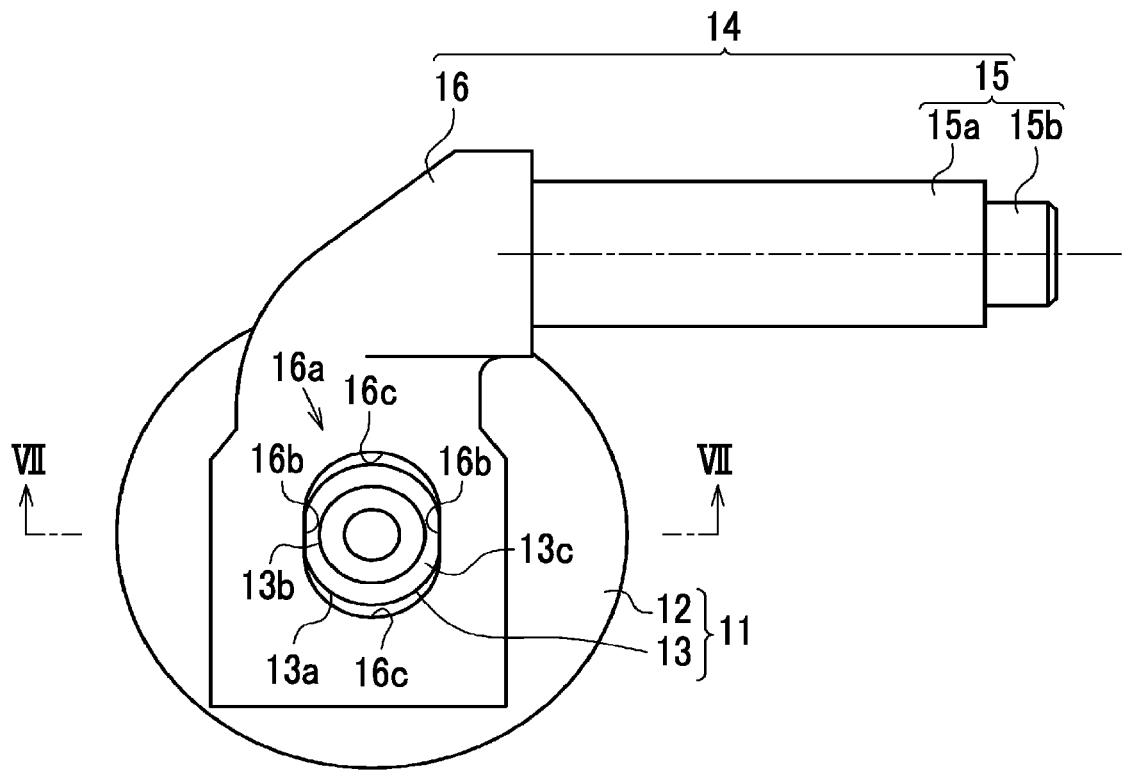
FIG. 6 is a top view of a swing arm with a valve shaft being inserted into the swing arm.
Figure 7:
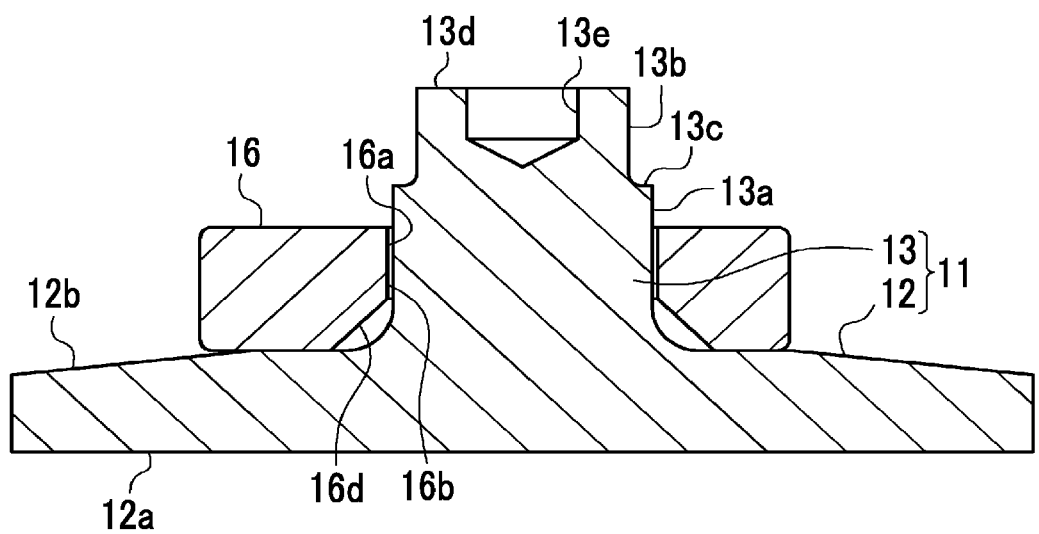
FIG. 7 is a sectional view taken along line VII-VII in FIG. 6.

As illustrated in FIG. 6, an inner circumferential surface of the insertion hole 16a is configured of two curved surface portions 16c and two parallel planar surface portions 16b that connect the two curved surface portions 16c to each other and that extend in the direction orthogonal to the central axis of the shaft 15. Each of the curved surface portion 16c is a semi-circular curved surface of the insertion hole 16a that is curved radially outwards. FIGS. 6 and 7 illustrate the valve body 11 and the swing arm 14 before attachment of the disc spring 18 and the supporting plate 17.

Since the planar surface portions 16b are present between the two semi-circular curved surface portions 16c as described above, the insertion hole 16a of the lever 16 is formed as a long hole of which a longitudinal direction is a direction that is parallel to the abutting surface 12a of the valve plate 12 and that is orthogonal to the central axis of the shaft 15. As illustrated in FIG. 7, a portion of the insertion hole 16a that is on the valve plate 12 side is formed as a tapered surface 16d that is inclined such that the inner diameter of the insertion hole 16a increases toward the valve plate 12 side.

As illustrated in FIGS. 6 and 7, the valve shaft 13 has a shape in which a large-diameter portion 13a that extends from the rear surface 12b of the valve plate 12 and a small-diameter portion 13b of which the diameter is smaller than the diameter of the large-diameter portion 13a are coaxially connected to each other. Therefore, as illustrated in FIG. 7, a step surface 13c is present on a portion of the valve shaft 13 at which the large-diameter portion 13a and the small-diameter portion 13b are connected to each other.

As illustrated in FIG. 6, the diameter of the large-diameter portion 13a is approximately the same as a gap between the two planar surface portions 16b of the insertion hole 16a. In addition, the large-diameter portion 13a has an approximately columnar shape but portions of the large-diameter portion 13a that face the planar surface portions 16b of the insertion hole 16a are flat. Therefore, as illustrated in FIG. 7, a gap between the planar surface portion 16b of the insertion hole 16a and the large-diameter portion 13a is extremely small. Meanwhile, as illustrated in FIG. 6, a gap larger than the gap between the planar surface portion 16b of the insertion hole 16a and the large-diameter portion 13a is present between the curved surface portion 16c of the insertion hole 16a and the large-diameter portion 13a.

The supporting plate 17 is riveted to be fixed to the valve shaft 13. That is, in the waste gate valve 10, the supporting plate 17 is fixed to the valve shaft 13 by assembling the supporting plate 17 that is provided with an insertion hole of which the inner diameter is slightly larger than the diameter of the small-diameter portion 13b with the valve shaft 13 in a state as illustrated in FIG. 7 and squashing a tip end of the valve shaft 13 in a state where the supporting plate 17 abuts onto the step surface 13c. When the supporting plate 17 is fixed, the disc spring 18 is placed on the lever 16 such that the valve shaft 13 is inserted into the insertion hole of the disc spring 18 before the supporting plate 17 is assembled with the valve shaft 13, and thus the disc spring 18 is clamped between the lever 16 and the supporting plate 17.

A tip end surface 13d of the valve shaft 13 is a flat surface and an insertion hole 13e is formed in the center of the tip end surface 13d. When the supporting plate 17 is fixed, the tip end of the valve shaft 13 is squashed toward the valve plate 12 side with a punch in a state where a pin provided on a tip end of the punch is inserted into the insertion hole 13e. Therefore, as illustrated in FIGS. 4 and 5, a portion of the small-diameter portion 13b that protrudes from the supporting plate 17 is spread outwards and the supporting plate 17 is fixed to the valve shaft 13.

In the waste gate valve 10, as described above, the insertion hole 16a provided in the lever 16 is a long hole and a gap is provided between the curved surface portion 16c of the insertion hole 16a and the valve shaft 13. Therefore, the valve body 11 of the waste gate valve 10 can tilt with respect to the lever 16 of the swing arm 14 with an axis that is parallel to the central axis of the shaft 15 as the center of rotation. That is, the valve body 11 is fixed to the lever 16 such that the valve body 11 tilts. Accordingly, when the waste gate valve 10 is closed, the valve body 11 tilts with respect to the lever 16 and the abutting surface 12a of the valve plate 12 comes into close contact with a portion of the turbine housing 130 on which the waste gate port 133 is open. Therefore, the waste gate port 133 can be reliably closed.

The material and dimensions of the disc spring 18 are selected such that the valve body 11 can tilt when the waste gate valve 10 is closed and the magnitude of vibration of the valve body 11 that occurs due to collision between the valve plate 12 and exhaust gas when the waste gate valve 10 is open falls within an allowable range.

In the turbocharger 100, the shaft 15 of the waste gate valve 10 penetrates the turbine housing 130 and extends up to a position outward of the turbine housing 130. The large-diameter portion 15a of the shaft 15 is supported by the turbine housing 130 such that the shaft 15 rotates. Therefore, the swing arm 14 rotates around the shaft 15 and the valve body 11 opens and closes the waste gate port 133.

As illustrated in FIGS. 1 and 2, a plate-shaped waste gate side link arm 25 is fixed to the small-diameter portion 15b of the shaft 15 that protrudes up to a position outward of the turbine housing 130. A columnar waste gate side connection pin 26 is fixed to a position separated from a portion of the waste gate side link arm 25 to which the small-diameter portion 15b of the shaft 15 is fixed such that the central axis of the waste gate side connection pin 26 becomes parallel to the central axis of the shaft 15.

As illustrated in FIG. 1, an actuator 20 for driving the waste gate valve 10 is fixed to the compressor housing 110. A motor is built into the actuator 20 and the actuator 20 drives a rotary shaft 22 via the motor. A plate-shaped actuator side link arm 23 is fixed to the rotary shaft 22. A columnar actuator side connection pin 24 is fixed to a position separated from a portion of the actuator side link arm 23 to which the rotary shaft 22 is fixed such that the central axis of the actuator side connection pin 24 becomes parallel to the central axis of the rotary shaft 22.

In the turbocharger 100, the actuator side link arm 23 and the waste gate side link arm 25 are connected to each other via a drive rod 30. Each of the opposite end portions of the drive rod 30 is provided with an insertion hole 32. In the drive rod 30, a cylindrical bush 31 is attached to each of the opposite end portions of rod-shaped rod main body 33, each of the opposite end portions having a wide disk-shape. Therefore, in the drive rod 30, an inner circumferential surface of the bush 31 constitutes the insertion hole 32.

The actuator side connection pin 24 and the waste gate side connection pin 26 have the same dimensions and the diameter of the insertion hole 32 is slightly larger than the diameters of the connection pins 24, 26.

A first end of the drive rod 30 is assembled with the waste gate side link arm 25 such that the waste gate side connection pin 26 is inserted into the insertion hole 32 and the first end is retained by an E-ring 50 that is fitted into a groove 26a provided on a tip end portion of the waste gate side connection pin 26.

A second end of the drive rod 30 is assembled with the actuator side link arm 23 such that the actuator side connection pin 24 is inserted into the insertion hole 32 and the second end is retained by the E-ring 50 that is fitted into a groove 24a provided on a tip end portion of the actuator side connection pin 24.

Disc spring 40 that urges the drive rod 30 in a direction in which the central axes of the connection pins 24, 26 extend are respectively clamped between the first end of the drive rod 30 and the waste gate side link arm 25 and between the second end of the drive rod 30 and the actuator side link arm 23. Each disc spring 40 is a disc spring with external teeth that is provided with an insertion hole 41 in the central portion thereof. The disc springs 40 are respectively attached to the connection pins 24, 26 along with the drive rod 30 such that the connection pins 24, 26 are respectively inserted into the insertion holes 41.

When the actuator 20 drives the rotary shaft 22 and the actuator side link arm 23 rotates around the rotary shaft 22, drive power from the actuator 20 is transmitted to the waste gate side link arm 25 via the drive rod 30. Then, the waste gate side link arm 25 rotates around the shaft 15 and the valve body 11 attached to the swing arm 14 is driven such that the valve body 11 approaches the waste gate port 133 or the valve body 11 becomes separated from the waste gate port 133. It is possible to open and close the waste gate port 133 by driving the actuator 20 as described above.

The operation and effect of the waste gate valve 10 will be described.

(1) Generally, since a gap formed between a valve plate and a lever or a gap formed between the lever and a supporting plate is small, realizing an elastic member such as a disc spring that is able to generate an appropriate urging force by being inserted into the gap having a small size is accompanied by a great restriction in selecting the material of the elastic member. Meanwhile, in a case where a gap formed between the valve plate and the lever or a gap formed between the lever and the supporting plate is purposely enlarged in order to make the above-described restriction less strict and a large elastic member is disposed in order to suppress the wobbling, wobbling of the valve body becomes intensive instead of being suppressed when the elastic member is weakened and the appropriate urging force becomes unable to be obtained.

With regard to this, in the waste gate valve 10, a gap between the supporting plate 17 and the lever 16 is narrowed by the protruding portion 61. Even when a gap between the supporting plate 17 and the lever 16 in an area where the disc spring 18 is installed is widened such that the degree of freedom in designing the disc spring 18 for obtaining an appropriate urging force is likely to be secured, it is possible to restrict relative movable ranges of the supporting plate 17 and the lever 16 in a direction in which the valve shaft 13 extends by means of the protruding portion 61. Therefore, even when the disc spring 18 is weakened, the magnitude of the wobbling is suppressed by the protruding portion 61.

That is, with the waste gate valve 10, it is possible to suppress restriction on designing the disc spring 18 since the gap in the area where the disc spring 18 is installed is widened and it is possible to suppress an increase in degree of the wobbling that occurs in a case where the disc spring 18 is weakened.

(2) Since the relative movable ranges of the supporting plate 17 and the lever 16 in the direction in which the valve shaft 13 extends are restricted by means of the protruding portion 61, the deformation amount of the disc spring 18 is limited to a small range in comparison with a case where the protruding portion 61 is not provided. Therefore, the deformation amount of the disc spring 18 is suppressed and the disc spring 18 is unlikely to be weakened in comparison with a case where the protruding portion 61 is not provided and the deformation amount of the disc spring 18 is not limited.

(3) Since the protruding portion 61 is integrated with the supporting plate 17, it is not needed to prepare a new component constituting the protruding portion 61. Therefore, it is possible to suppress an increase in number of components.

(4) Since the waste gate valve is provided in the turbine housing in which exhaust gas having an extremely high temperature flows, the exhaust gas having the extremely high temperature flows into a space between the supporting plate and the valve plate. With regard to this, in the waste gate valve 10, the protruding portion 61 is provided farther from the valve shaft 13 than the disc spring 18 and the disc spring 18 is covered from the outside with the protruding portion 61. Therefore, exhaust gas that flows into a space between the supporting plate 17 and the lever 16 and that proceeds toward the disc spring 18 is blocked by the protruding portion 61, and thus it is possible to suppress collision between the disc spring 18 and the exhaust gas. Since the protruding portion 61 has a continuous annular shape, it is possible to restrain the exhaust gas from flowing toward the disc spring 18 over the whole circumference. Therefore, it is possible to suppress the progress of creep deformation of the disc spring 18 that occurs due to collision with the exhaust gas having the extremely high temperature.

(5) Since the annular disc spring 18 is adopted as an elastic member that urges the lever 16 and the disc spring 18 is disposed in a state where the valve shaft 13 is inserted into the disc spring 18, it is possible to suppress the wobbling over the whole circumference of the valve shaft 13 by using the disc spring 18.

(6) The protruding portion 61 has an annular shape centered on the valve shaft 13. Therefore, it is possible to restrict the magnitude of the wobbling over the entire circumferential area in the vicinity of the valve shaft 13 by means of the protruding portion 61.

The aspect of the present disclosure can be implemented in the following forms obtained by appropriately modifying the embodiment. A case where the annular disc spring 18 is adopted has been used as an example. However, the disc spring may be a disc spring with external teeth that is provided with an insertion hole in the central portion thereof. The disc spring may be a disc spring with internal teeth that is provided with an insertion hole in the central portion thereof. That is, a portion of the disc spring that abuts onto the supporting plate 17 or a portion of the disc spring that abuts onto the lever 16 may not be continuous in a circumferential direction.

The valve body 11 may not be molded to have a shape in which the valve plate 12 and the valve shaft 13 are integrated with each other. That is, the valve body 11 may be configured by molding the valve plate 12 and the valve shaft 13 as separated components and combining the separated components to connect the valve plate 12 and the valve shaft 13 to each other.

Figure 8:
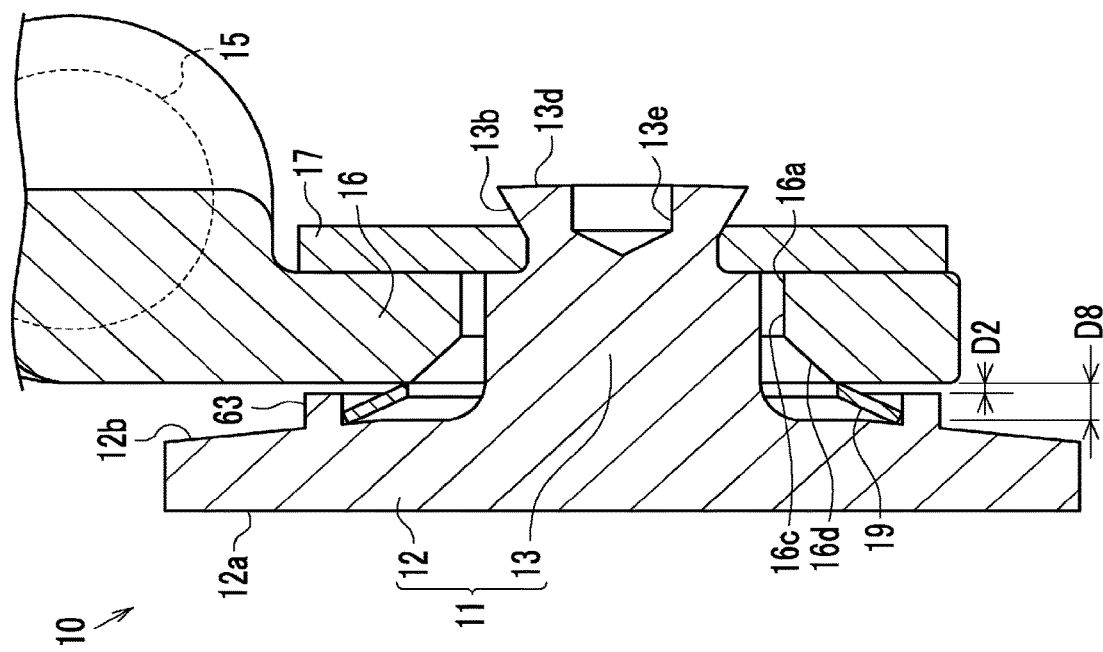
FIG. 8 is a sectional view of a waste gate valve of a modification example.

The disc spring may have any configuration as long as the disc spring is assembled with the valve shaft 13 along with the lever 16 such that the wobbling of the valve body 11 is suppressed. For example, as illustrated in FIG. 8, a configuration in which an annular disc spring 19 is provided between the lever 16 and the rear surface 12*b* of the valve plate 12 may be adopted. Here, the disc spring 19 is clamped between the valve plate 12 and the supporting plate 17 along with the lever 16 such that the valve shaft 13 is inserted into the disc spring 19. In this manner, the disc spring 19 is clamped between the lever 16 and the valve plate 12 in a state of being elastically deformed. Accordingly, the disc spring 19 urges the lever 16 with a restoring force of the disc spring 19 such that the lever 16 is pressed against the supporting plate 17, and thus the wobbling of the valve body 11 is suppressed.

In the waste gate valve 10, the rear surface 12*b* of the valve plate 12 is provided with a protruding portion 63 that protrudes toward the lever 16 side. The protruding portion 63 is integrated with the valve body 11 and the protruding portion 63 has a continuous annular shape. That is, the protruding portion 63 has an annular shape centered on the valve shaft 13. In addition, the protruding portion 63 is provided farther from the valve shaft 13 than the disc spring 19 such that an outer side of the disc spring 19 is surrounded by the protruding portion 63. Therefore, an outer edge portion of the disc spring 19 is covered from the outside with the protruding portion 63 over the whole circumference.

As described above, in the waste gate valve 10, the protruding portion 63 that protrudes toward the lever 16 side is provided on a position on the valve plate 12 that is farther from the valve shaft 13 than the disc spring 19. Since the protruding portion 63 is provided, a gap between the lever 16 and the valve plate 12 is the narrowest in an area where the protruding portion 63 is provided. Specifically, a gap D2 between the protruding portion 63 of the valve plate 12 and the lever 16 is smaller than a gap D8 between the lever 16 and the valve plate 12 in an area other than the area where the protruding portion 63 is provided (for example, area where disc spring 19 is disposed). In the above-described configuration, a gap between the valve plate 12 and the lever 16 is narrowed by the protruding portion 63. Therefore, it is possible to achieve the same effects as the effects (1) to (6) of the embodiment.

The protruding portion may be disposed on a position such that the disc spring abuts onto the protruding portion before the protruding portion abuts onto a member out of the supporting plate 17, the lever 16, and the valve plate 12 that faces the protruding portion. For example, as illustrated in FIG. 8, the protruding portion may be provided in a position such that the protruding portion abuts onto the disc spring in advance. The diameter of the disc spring changes as the disc spring is compressed and squashed. Therefore, when the disc spring abuts onto the protruding portion disposed inward or outward of the disc spring while the disc spring is being squashed, the disc spring becomes unlikely to be deformed. When the protruding portion is disposed on a position such that the disc spring abuts onto the protruding portion before the protruding portion abuts onto a member out of the supporting plate 17, the lever 16, and the valve plate 12 that faces the protruding portion, the disc spring abuts onto the protruding portion before the member facing the protruding portion abuts onto the protruding portion. Therefore, the disc spring becomes unlikely to be deformed before the member facing the protruding portion and the protruding portion collide with each other, and thus the valve body is restrained from moving in a direction such that collision of the protruding portion occurs with the disc spring being further deformed. Accordingly, it is possible to suppress a shock or noise that is generated due to collision between the member facing the protruding portion and the protruding portion. As long as the disc spring abuts onto the protruding portion before the protruding portion abuts onto the member facing the protruding portion, the protruding portion may not be disposed on a position such that the protruding portion abuts onto the disc spring in advance and the protruding portion may be disposed such that a slight gap is formed between the protruding portion and the disc spring.

Figure 9:
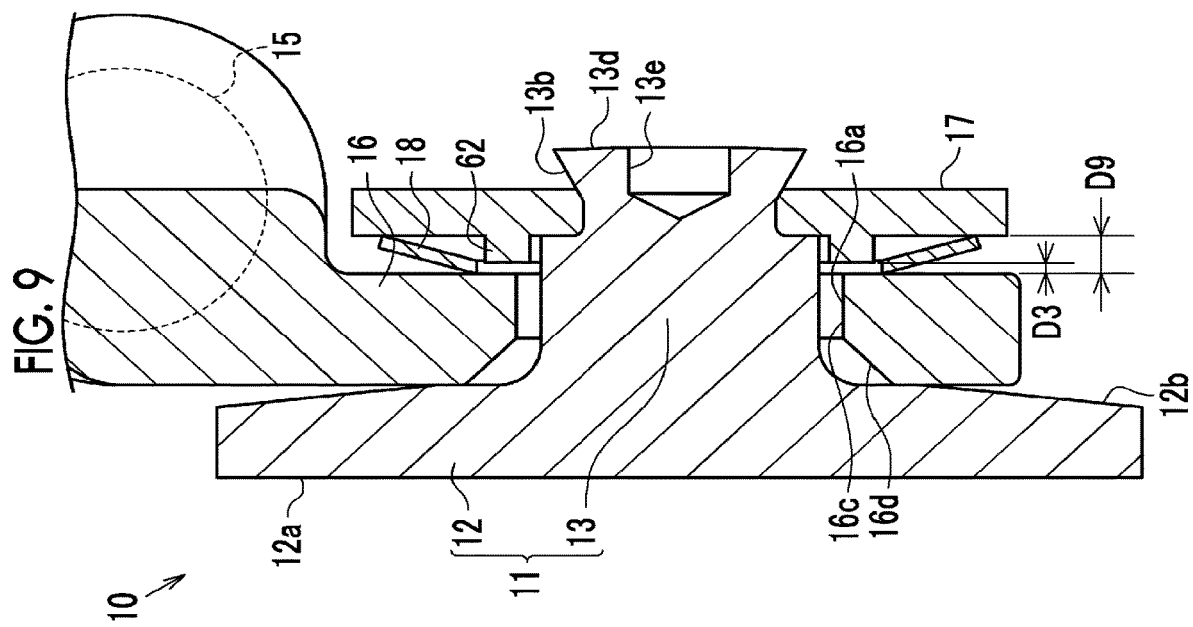
FIG. 9 is a sectional view of a waste gate valve of another modification example.

A configuration in which the protruding portion is provided to be positioned closer to the valve shaft 13 than the disc spring may be adopted. For example, a configuration in which an annular protruding portion 62 of which the diameter is smaller than the diameter of the insertion hole of the disc spring 18 is provided on the supporting plate 17 as illustrated in FIG. 9 may be adopted. The protruding portion 62 is provided on a position on the supporting plate 17 that is closer to the valve shaft 13 than the disc spring 18 and the protruding portion protrudes toward the lever 16. Accordingly, a gap between the supporting plate 17 and the lever 16 is the narrowest in an area where the protruding portion 62 is provided. That is, a gap D3 between the protruding portion 62 and the lever 16 is smaller than the gap D9 between the supporting plate 17 and the lever 16 in an area where the disc spring 18 is disposed.

In the above-described configuration, a gap between the supporting plate 17 and the lever 16 is narrowed by the protruding portion 62. Therefore, although it is not possible to achieve an effect of blocking exhaust gas that flows into the gap between the supporting plate 17 and the lever 16 from the outside, it is possible to achieve the same effects as the effects (1), (2), (3), (5), and (6) of the embodiment.

Figure 10:
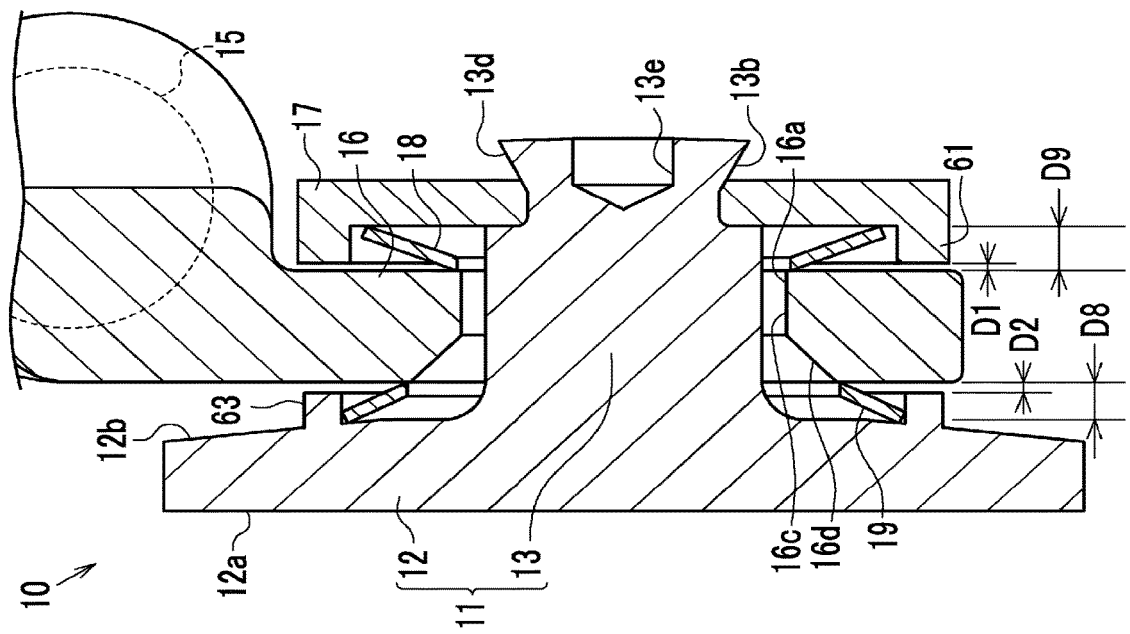
FIG. 10 is a sectional view of a waste gate valve of still another modification example.

In the embodiment, a case where the disc spring 18 is provided in a space between the lever 16 and the supporting plate 17 out of a space between the valve plate 12 and the lever 16 and a space between the lever 16 and the supporting plate 17 has been used as an example. However, as illustrated in FIG. 10, a configuration in which the disc spring 19 is provided in a space between the lever 16 and the rear surface 12b of the valve plate 12 may be combined with a configuration in the embodiment. That is, the disc spring may be provided in both of a space between the valve plate 12 and the lever 16 and a space between the lever 16 and the supporting plate 17.

As illustrated in FIG. 10, in a case where the above-described configuration is adopted, the lever 16 is urged such that the lever 16 becomes separated from both of the supporting plate 17 and the valve plate 12 due to a restoring force of the disc spring 18 and a restoring force of the disc spring 19. That is, the lever 16 does not abut onto both of the supporting plate 17 and the valve plate 12 and the lever 16 is positioned between the supporting plate 17 and the valve plate 12.

In addition, a gap between the supporting plate 17 and the lever 16 is narrowed by the protruding portion 61 and a gap between the lever 16 and the valve plate 12 is narrowed by the protruding portion 63. Therefore, it is possible to achieve the same effects as the effects (1) to (6) of the embodiment for both of the supporting plate 17 side and the valve plate 12 side.

Figure 11:
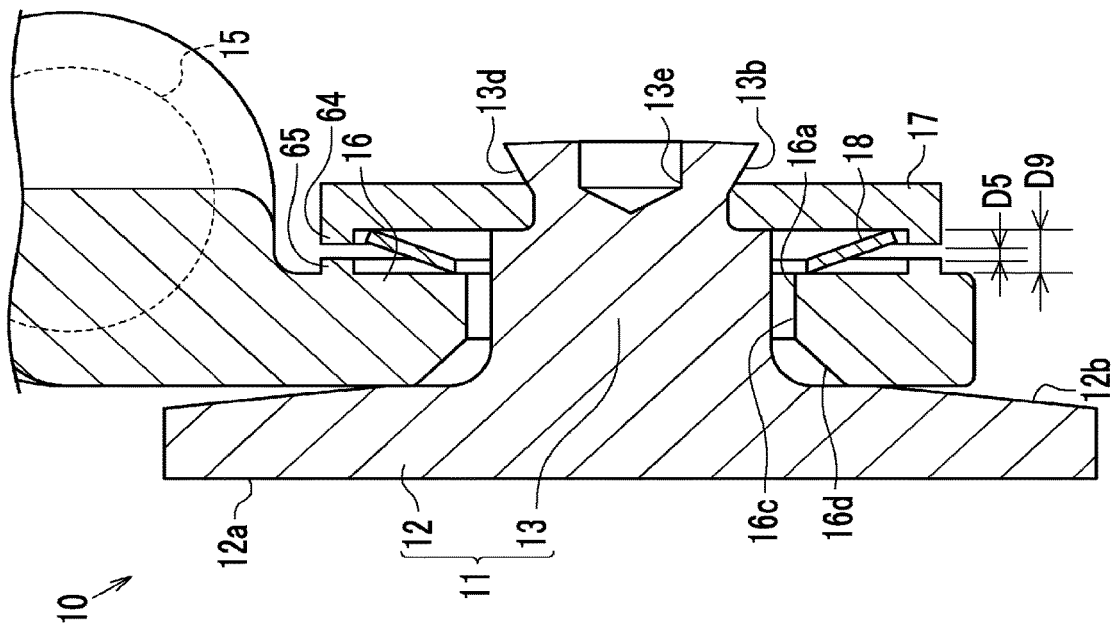
FIG. 11 is a sectional view of a waste gate valve of still another modification example.

A configuration in which a gap is narrowed by protruding portions protruding from members that face each other with the disc spring being interposed therebetween as illustrated in FIG. 11 may also be adopted. In the configuration as illustrated in FIG. 11, a protruding portion 64 that protrudes toward the lever 16 side is provided on the supporting plate 17 and a protruding portion 65 that protrudes toward the supporting plate 17 side is provided on a position on the lever 16 that faces the protruding portion 64. In addition, a gap between the supporting plate 17 and the lever 16 is the narrowest in an area where the protruding portion 64 and the protruding portion 65 face each other. That is, a gap D5 between the protruding portion 64 and the protruding portion 65 is smaller than the gap D9 between the supporting plate 17 and the lever 16 in an area where the disc spring 18 is disposed. That is, a gap between the supporting plate 17 and the lever 16 is narrowed by the protruding portion 64 and the protruding portion 65. Therefore, with the above-described configuration, it is possible to achieve the same effects as the effects (1) to (6) of the embodiment.

Figure 12:
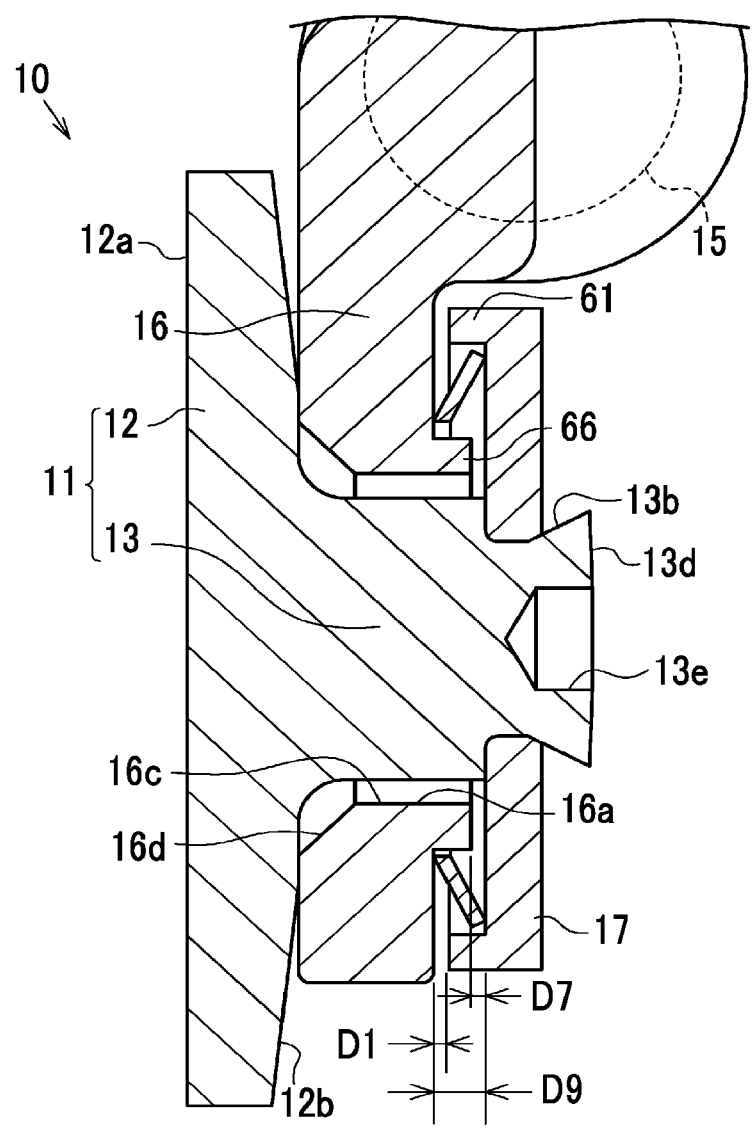
FIG. 12 is a sectional view of a waste gate valve of still another modification example.

However, as illustrated in FIG. 12, a configuration in which the protruding portion is provided to be positioned closer to the valve shaft 13 than the disc spring and a configuration in which the protruding portion is provided to be positioned farther from the valve shaft 13 than the disc spring may be combined with each other. In an example illustrated in FIG. 12, the protruding portion 61 protrudes toward the lever 16 side from the supporting plate 17 as with the embodiment and a protruding portion 66 that protrudes toward the supporting plate 17 side is provided on a position on the lever 16 that is closer to the valve shaft 13 than the disc spring 18. The protruding portion 66 has a continuous annular shape and the diameter of the protruding portion 66 is smaller than the inner diameter of the disc spring 18. Therefore, a gap between the supporting plate 17 and the lever 16 becomes narrow in an area where the protruding portion 61 is provided and in an area where the protruding portion 66 is provided. That is, the gap D1 between the protruding portion 61 and the lever 16 is smaller than the gap D9 between the supporting plate 17 and the lever 16 in an area where the disc spring 18 is disposed and a gap D7 between the protruding portion 66 and the supporting plate 17 is also smaller than the gap D9. In a case where the above-described configuration is adopted, it is possible to restrict the movable range of the lever 16 between the valve plate 12 and the supporting plate 17 by means of the protruding portion 66 in addition to the protruding portion 61, and thus it is possible to suppress the wobbling of the valve body 11.

The protruding portion may not have a continuous annular shape. A configuration in which a plurality of protruding portions is provided to be centered on the valve shaft 13 such that the protruding portions are arranged to surround the valve shaft 13 in a state of being separated from each other may be adopted. The protruding portions may not be disposed to surround the valve shaft 13. For example, the number of the protruding portions being provided may be one. In this case also, the gap is narrowed such that the movable range of the lever 16 between the valve plate 12 and the supporting plate 17 is restricted, and thus it is possible to suppress the wobbling of the valve body 11.

The protruding portion may not be integrated with a member on which the protruding portion is provided. That is, the protruding portion may be configured by attaching a separate component. An elastic member that is disposed between the valve plate 12 and the lever 16 or between the lever 16 and the supporting plate 17 may be a member other than the disc spring. For example, a coil spring may be interposed between the valve plate 12 and the lever 16 or between the lever 16 and the supporting plate 17. When an elastic member is interposed between the valve plate 12 and the lever 16 or between the lever 16 and the supporting plate 17, it is possible to further suppress the wobbling of the valve body 11 by means of a restoring force of the elastic member.

Members with an elastic member being interposed therebetween are preferably formed to have shapes such that the entire elastic member can be covered from opposite sides by the members with the elastic member being interposed therebetween. For example, when the lever 16 is enlarged as represented by a two-dot chain line in FIG. 4, it is possible to cover the entire disc spring 18 with the supporting plate 17 and the lever 16. In a case where the above-described configuration is adopted, an elastic member is covered by members with the elastic member being interposed therebetween, and thus collision between the elastic member and exhaust gas can be suppressed. Therefore, it is possible to suppress the progress of creep deformation of the elastic member that occurs due to collision with exhaust gas having an extremely high temperature.

What is claimed is:

1. A waste gate valve for a turbocharger, the turbocharger including a turbine housing, the turbine housing including a waste gate port, the waste gate valve comprising:
    a valve body including a valve plate and a valve shaft, the valve plate being configured to abut onto the turbine housing and to close the waste gate port, the valve shaft being disposed on a rear surface of the valve plate that is opposite to an abutting surface of the valve plate that closes the waste gate port;
    a swing arm including a shaft and a lever, the shaft being supported such that the shaft rotates with respect to the turbine housing, the lever being formed with an insertion hole into which the valve shaft is inserted;
    a supporting plate fixed to a portion of the valve shaft that protrudes from the insertion hole, the supporting plate being fixed to the valve shaft such that the lever is interposed between the supporting plate and the valve plate; and
    an elastic member clamped between the supporting plate and the lever or between the lever and the valve plate, the elastic member being configured to urge the lever in a direction in which the valve shaft extends, wherein:
    the valve body is fixed such that the valve body tilts with respect to the lever; and
    one of the supporting plate and the lever that clamp the elastic member or one of the lever and the valve plate that clamp the elastic member includes a protruding portion that is positioned closer to the valve shaft than the elastic member or farther from the valve shaft than the elastic member and that protrudes toward the other of the supporting plate and the lever or toward the other of the lever and the valve plate.

2. The waste gate valve according to claim 1, wherein the protruding portion is integrated with any of the supporting plate, the lever, and the valve plate as a portion of any of the supporting plate, the lever, and the valve plate.

3. The waste gate valve according to claim 1, wherein the protruding portion is disposed farther from the valve shaft than the elastic member.

4. The waste gate valve according to claim 1, wherein:
    an entire supporting plate side surface of the elastic member is covered with a member out of the supporting plate and the lever that faces the elastic member; and
    an entire valve plate side surface of the elastic member is covered with a member out of the lever and the valve plate that faces the elastic member.

5. The waste gate valve according to claim 1, wherein the elastic member is an annular disc spring into which the valve shaft is inserted and that is interposed between the supporting plate and the valve plate along with the lever.

6. The waste gate valve according to claim 5, wherein the protruding portion is disposed on a position such that the disc spring abuts onto the protruding portion before the protruding portion abuts onto a member out of the supporting plate, the lever, and the valve plate that faces the protruding portion.

7. The waste gate valve according to claim 1, wherein the protruding portion has an annular shape centered on the valve shaft.

8. The waste gate valve according to claim 1, wherein;
    the elastic member is clamped in each of a space between the lever and the supporting plate and a space between the lever and the valve plate; and
    one of the supporting plate and the lever that clamp the elastic member or one of the lever and the valve plate that clamp the elastic member includes a protruding portion that is positioned closer to the valve shaft than the elastic member or farther from the valve shaft than the elastic member and that protrudes toward the other of the supporting plate and the lever or toward the other of the lever and the valve plate.

* * * * *